United States Patent
Parmentier et al.

(10) Patent No.: US 12,536,555 B1
(45) Date of Patent: Jan. 27, 2026

(54) PREDICTIVE TRANSACTION MODELS AND DEPLOYMENT

(71) Applicant: Freedom Financial Network, LLC, San Mateo, CA (US)

(72) Inventors: Jean-Marc Parmentier, San Mateo, CA (US); Robert Adams, San Mateo, CA (US); Carlyn Lamia, San Mateo, CA (US); Edward Park, San Mateo, CA (US); Gerard Tano, San Mateo, CA (US)

(73) Assignee: Freedom Financial Network, LLC, San Mateo, CA (US)

( * ) Notice: Subject to any disclaimer, the term of this patent is extended or adjusted under 35 U.S.C. 154(b) by 40 days.

(21) Appl. No.: 18/101,050

(22) Filed: Jan. 24, 2023

(51) Int. Cl.
*G06Q 30/02* (2023.01)
*G06Q 30/0202* (2023.01)

(52) U.S. Cl.
CPC .............................. *G06Q 30/0202* (2013.01)

(58) Field of Classification Search
None
See application file for complete search history.

(56) References Cited

U.S. PATENT DOCUMENTS

| | | |
|---|---|---|
| 6,456,983 B1 | 9/2002 | Keyes |
| 7,165,044 B1 | 1/2007 | Chaffee |
| 7,860,781 B1 | 12/2010 | Bodi |
| 8,204,809 B1 * | 6/2012 | Wise .................. G06Q 40/06 705/36 R |
| 8,694,430 B2 | 4/2014 | Kobayashi |
| 8,719,132 B1 | 5/2014 | Diggdon |
| 9,552,610 B1 | 1/2017 | Tewell |
| 10,069,972 B1 | 9/2018 | Molander |
| 10,163,156 B1 | 12/2018 | Shapley et al. |
| 10,169,784 B1 | 1/2019 | Hildebrand |
| 10,242,402 B1 | 3/2019 | Soccorsy |
| 10,460,379 B1 | 10/2019 | Diggdon |
| 10,672,076 B2 | 6/2020 | Pillai |
| 10,825,028 B1 | 11/2020 | Kramme |
| 10,891,037 B1 | 1/2021 | Mackrell |
| 11,087,412 B1 * | 8/2021 | Ho .................. G06Q 40/125 |
| 11,176,461 B1 | 11/2021 | Merritt |

(Continued)

FOREIGN PATENT DOCUMENTS

| | | |
|---|---|---|
| WO | WO-2001/059671 A2 | 8/2001 |
| WO | WO-0157756 A1 | 8/2001 |

(Continued)

OTHER PUBLICATIONS

Authors: B. Landfeldt et al: User Service Assistant: an end-to-end reactive QoS architecture; Date of Conference: May 18-20, 1998 Date Added to IEEE Xplore: Aug. 6, 2002 (Year: 2002).

(Continued)

*Primary Examiner* — Arif Ullah
(74) *Attorney, Agent, or Firm* — Mahamedi IP Law LLP

(57) ABSTRACT

A computer system, computer-implemented method and non-transitory computer-readable medium to predict transaction activity for a cyclical time period. A predictive transaction model is developed for individual user accounts, where the transaction model incorporates a cyclical data structure representation to detect and analyze transactions.

13 Claims, 7 Drawing Sheets

(56) References Cited

U.S. PATENT DOCUMENTS

| | | | |
|---|---|---|---|
| 11,227,335 B2 | 1/2022 | Hayden | |
| 11,249,985 B2 | 2/2022 | Wu et al. | |
| 11,270,375 B1 | 3/2022 | Jennings | |
| 11,509,771 B1 | 11/2022 | Ross | |
| 11,551,293 B1 | 1/2023 | Soccorsy | |
| 11,615,077 B1 | 3/2023 | Roka | |
| 11,790,268 B1 * | 10/2023 | Wick | G06N 5/04 706/12 |
| 11,853,982 B1 | 12/2023 | Woodward | |
| 12,002,087 B1 | 6/2024 | McCormick et al. | |
| 2002/0046049 A1 | 4/2002 | Siegel | |
| 2002/0138409 A1 | 9/2002 | Bass | |
| 2003/0105688 A1 | 6/2003 | Brown | |
| 2003/0229560 A1 | 12/2003 | Bourassa et al. | |
| 2004/0019560 A1 | 1/2004 | Evans | |
| 2004/0243508 A1 | 12/2004 | Samson | |
| 2005/0075914 A1 | 4/2005 | Bayne | |
| 2005/0256735 A1 | 11/2005 | Bayne | |
| 2006/0010057 A1 | 1/2006 | Bradway et al. | |
| 2006/0080197 A1 | 4/2006 | Chi | |
| 2006/0293983 A1 | 12/2006 | Rosenblatt | |
| 2008/0147521 A1 | 6/2008 | Weaver | |
| 2009/0006226 A1 | 1/2009 | Crowder | |
| 2009/0048957 A1 | 2/2009 | Celano | |
| 2009/0125375 A1 | 5/2009 | Bateni | |
| 2009/0276368 A1 | 11/2009 | Martin | |
| 2009/0276705 A1 | 11/2009 | Ozdemir | |
| 2010/0111287 A1 | 5/2010 | Xie | |
| 2010/0217706 A1 | 8/2010 | Griffin | |
| 2011/0161155 A1 | 6/2011 | Wilhelm | |
| 2011/0178922 A1 | 7/2011 | Imrey | |
| 2011/0251978 A1 | 10/2011 | Davies | |
| 2012/0066106 A1 | 3/2012 | Papadimitriou | |
| 2012/0246048 A1 | 9/2012 | Cohen | |
| 2013/0054435 A1 | 2/2013 | Zhang | |
| 2013/0085936 A1 | 4/2013 | Law | |
| 2013/0179338 A1 | 7/2013 | Evans | |
| 2013/0290165 A1 | 10/2013 | Cerise | |
| 2014/0310151 A1 | 10/2014 | Shishkov | |
| 2014/0316810 A1 | 10/2014 | Olive | |
| 2014/0365350 A1 | 12/2014 | Shvarts | |
| 2014/0365353 A1 | 12/2014 | Shvarts | |
| 2015/0039388 A1 * | 2/2015 | Rajaraman | G06Q 30/0613 705/7.29 |
| 2015/0046214 A1 | 2/2015 | Jain | |
| 2015/0379488 A1 | 12/2015 | Ruff | |
| 2016/0110813 A1 | 4/2016 | Hayden | |
| 2016/0232546 A1 | 8/2016 | Ranft | |
| 2016/0275608 A1 | 9/2016 | Dintenfass | |
| 2016/0275610 A1 | 9/2016 | Dintenfass | |
| 2016/0307272 A1 | 10/2016 | Thalker | |
| 2017/0013131 A1 | 1/2017 | Craib | |
| 2017/0262821 A1 | 9/2017 | Imrey | |
| 2018/0012300 A1 | 1/2018 | Imrey | |
| 2018/0082372 A1 | 3/2018 | Diana | |
| 2018/0096319 A1 | 4/2018 | Aggarwal | |
| 2018/0096386 A1 | 4/2018 | Aggarwal | |
| 2018/0181903 A1 | 6/2018 | Kojima et al. | |
| 2019/0034951 A1 * | 1/2019 | Cole | G06Q 10/06393 |
| 2019/0130016 A1 | 5/2019 | Jennings | |
| 2019/0236461 A1 | 8/2019 | Wong | |
| 2019/0351766 A1 | 11/2019 | Spivak | |
| 2019/0378207 A1 | 12/2019 | Dibner-Dunlap | |
| 2020/0074539 A1 | 3/2020 | Palaghita | |
| 2020/0074540 A1 | 3/2020 | Wolfe | |
| 2020/0104843 A1 | 4/2020 | Bhasin | |
| 2020/0104935 A1 | 4/2020 | Schmitt | |
| 2020/0111159 A1 | 4/2020 | Sambhar | |
| 2020/0151697 A1 | 5/2020 | Pinto | |
| 2020/0257680 A1 | 8/2020 | Danyi | |
| 2020/0334685 A1 | 10/2020 | Yan | |
| 2020/0351403 A1 | 11/2020 | George | |
| 2020/0394159 A1 | 12/2020 | Hurley et al. | |
| 2020/0402625 A1 | 12/2020 | Aravamudan | |
| 2020/0410583 A1 | 12/2020 | Hart | |
| 2021/0073909 A1 | 3/2021 | Le Roux | |
| 2021/0081271 A1 | 3/2021 | Doshi | |
| 2021/0124576 A1 | 4/2021 | Gungabeesoon | |
| 2021/0133670 A1 | 5/2021 | Cella | |
| 2021/0142384 A1 | 5/2021 | Nori | |
| 2021/0201359 A1 | 7/2021 | Sekar | |
| 2021/0201394 A1 | 7/2021 | Lemanski | |
| 2021/0256084 A1 | 8/2021 | Marsh | |
| 2022/0076834 A1 | 3/2022 | Hanlon | |
| 2022/0101383 A1 | 3/2022 | Bloom | |
| 2022/0138280 A1 | 5/2022 | Riggs | |
| 2022/0255969 A1 | 8/2022 | Cage | |
| 2022/0345543 A1 | 10/2022 | Oleinikov | |
| 2022/0406463 A1 | 12/2022 | Hanlon | |
| 2023/0006976 A1 | 1/2023 | Jakobsson | |
| 2023/0070467 A1 | 3/2023 | Lim | |
| 2023/0075411 A1 | 3/2023 | Jeph | |
| 2023/0125183 A1 | 4/2023 | Olesen | |
| 2023/0127675 A1 | 4/2023 | Olesen | |
| 2023/0128256 A1 | 4/2023 | Olesen | |
| 2023/0162191 A1 | 5/2023 | Valencia | |
| 2023/0325840 A1 * | 10/2023 | Visegrady | G06Q 20/4014 705/64 |
| 2023/0342761 A1 * | 10/2023 | Zhang | H04L 9/3236 |
| 2024/0112157 A1 | 4/2024 | Sun et al. | |

FOREIGN PATENT DOCUMENTS

| | | |
|---|---|---|
| WO | WO-2003/048996 A1 | 6/2003 |
| WO | WO-2005/096204 | 10/2005 |
| WO | WO-2018/033934 | 2/2018 |

OTHER PUBLICATIONS

Authors: Xin Bai et al: Coordination in Intelligent Grid Environments; Published in: Proceedings of the IEEE ( vol. 93, Issue: 3 Mar. 2005) pp. 613-630; Date of Publication: Feb. 28, 2005 (Year: 2005).

"How to Read your Escrow Statement", found online at https://www.spservicing.com/Content/pdf/HowToReadStatement_BKEscrowStatement.pdf (Year: 2017).

12 CFR 1024.17 (Year: 2017).

* cited by examiner

PREDICTIVE TRANSACTION MODELS AND DEPLOYMENT

TECHNICAL FIELD

Examples as described relate to predictive transaction models and deployment.

BACKGROUND

Computing technology has advanced to the point where the technology to support use of sophisticated models, such machine-learning models, neural networks and the like, is readily available. The use of mobile devices, such as mobile communication devices and tablets, has also greatly expanded the access of users to such technology. Mobile devices can now be used to implement platforms, using mobile applications, to enable fluid use of sophisticated models in everyday situations.

DETAILED DESCRIPTION

Figure 1A:
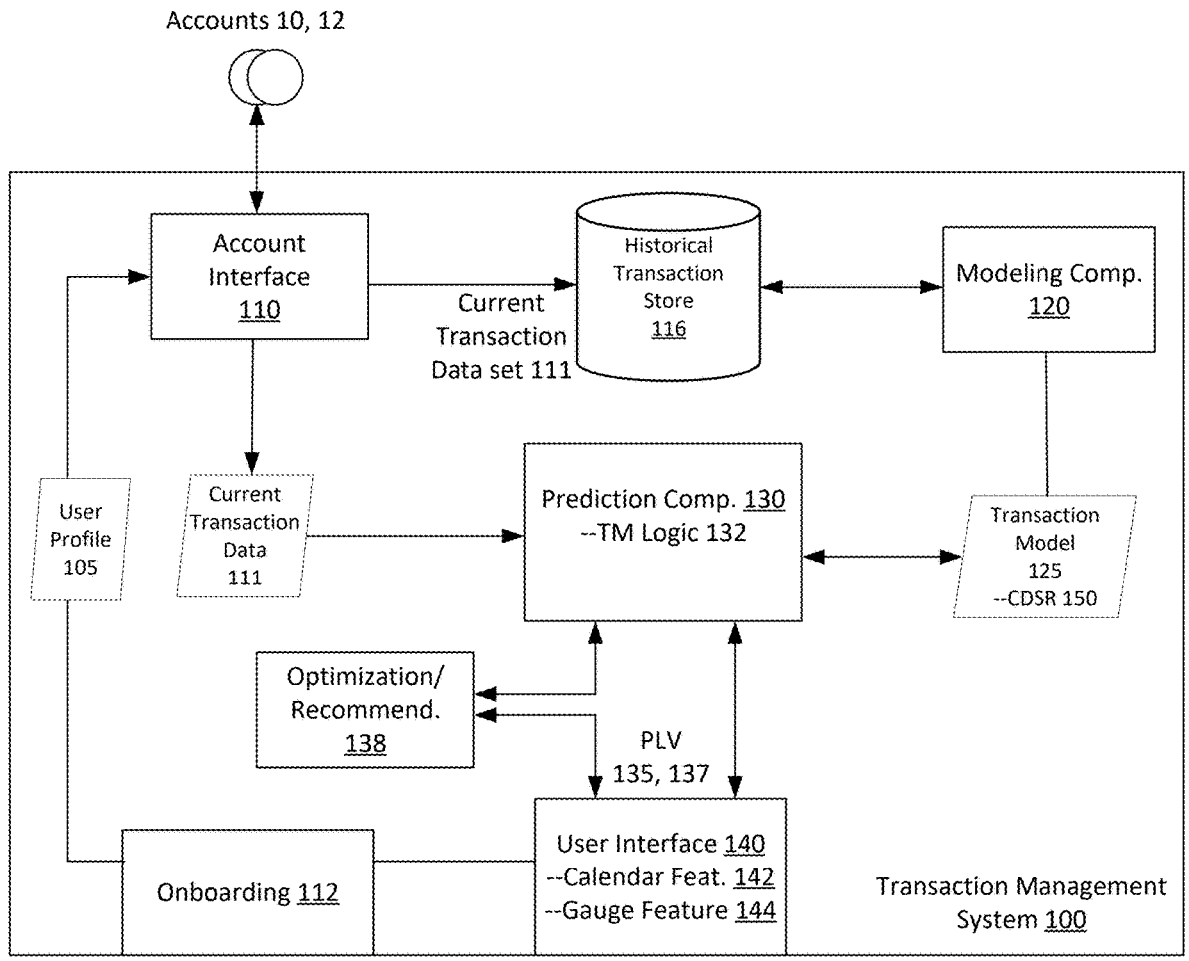
FIG. 1A illustrates a transaction management system, according to one or more embodiments.

Embodiments include a computing device, method and system for predicting transaction information for one or more user accounts. The predictive determinations can include identifying expected transactions and ledger values for a current time period.

According to embodiments, a network system accesses accounts of a user to predict, over the course of a current cyclical time period, a net ledger value for the user's account(s), for an end interval of a current cyclical time period.

Still further, in some embodiments, a computer system operates to provide a user-interface that is dynamically responsive to transactions of a current cyclical time interval, to reflect unexpected transaction activity.

In examples, the computer system can be configured for alternative cyclical time periods, such as cyclical time periods corresponding to weekly, semi-monthly, monthly, quarterly, semi-annually or annually. In examples, an interval can correspond to a day, or a business day.

Further, the net ledger value correspond to a sum total of debits and credits which occur with respect to accounts over the course of a predetermined cyclical time period (e.g., calendar month).

In context of a calendar month, examples provide for a computer system that predicts a net ledger value for the user's accounts on the final day of the month, where the predicted net ledger value is calculated on any day of the current month preceding the final day.

In some examples, the predicted net ledger value can be calculated for an upcoming cyclical time period. In a calendar month example, the net ledger value can be calculated for an upcoming month, before the month commences.

In examples, a computer system can determine an initial net ledger value, representing the predicted net ledger value calculated or before the initial interval of the current or upcoming cyclical time interval, for the end interval of the current or upcoming cyclical time period. Subsequently, over the course of the cyclical time period, an example computer system monitors the accounts of the user and updates the predicted net ledger value (for the end interval) based on detected transaction activity.

In some examples, a computer system updates a predicted net ledger value based on unexpected transaction activity, where the unexpected transaction activity includes (i) transactions which have unexpected (or abnormal) amounts, (ii) transactions which are unexpected (or not accounted for when the predicted net ledger value was determined), and/or (iii) transactions which were expected (or accounted for when the predicted net ledger value was determined) but which did not occur.

According to some examples, a computer system operates to obtain historical transaction information for one or more accounts of a user, over a prior time interval that includes multiple prior cyclical time periods. The historical transaction information can identify a plurality of transactions, wherein each of the plurality of transactions are associated with a transaction amount and a transaction date. A transaction model is generated by (i) mapping each of the plurality of transactions onto a circular data structure representation of a cyclical time interval, where each mapped transaction is associated with a corresponding position on the circular data structure representation. The mapped position of each transaction can include (a) a radial position that indicates a time interval during one of the prior cyclical time intervals that coincides with the associated transaction date, and (b) a height that is based on the associated transaction amount. A plurality of baseline transaction data sets can be determined, where each baseline transaction data set corresponding to a set of multiple transactions that are deemed similar to one another based on the corresponding positions associated with each of the multiple transactions with respect to the circular data structure representation. On or before a start interval of a current cyclical time period, based on the historical transaction information, an initial net ledger value is determined for the one or more accounts at an end interval of the current cyclical time period.

During an intermediate time interval preceding the end time interval, the computer system can generate a graphic feature that is indicative of an updated net ledger value. The computer system can detect multiple transactions that occur with respect to the one or more accounts in a span that extends from the starting time interval until the intermediate time interval. For each of the multiple detected transactions, a similarity determination is made with respect to the baseline transaction data sets. The net ledger value can be updated, based on the similarity determinations and/or the predicted net ledger value. The computer system configures the graphic feature to be indicative of the updated net ledger value.

Still further, in some variations, a computer system operates to obtain historical transaction data for one or more accounts of a user. At a starting interval of a current cyclical time period, based on the historical transaction data, the computer system determines an initial net ledger value for an end interval of the current cyclical time period. At multiple instances during the current cyclical time period, the net ledger value is updated by (i) monitoring the one or more accounts of the user to detect transactions that occur with respect to the one or more accounts, and (ii) updating the net ledger value based at least in part on transaction activity that was not accounted for in determining the initial ledger value. The computer system can respond to an input trigger during the current time interval, to generate a gauge user-interface feature that is structured to include a needle angularly positionable between a minimum value and a maximum value. The computer system can position the needle to reflect the updated net ledger value for the current time interval.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. Examples described herein may be implemented, in whole or in part, on computing devices such as servers, desktop computers, cellular or smartphones, laptop computers, printers, network equipment (e.g., routers) and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples can be carried and/or executed. In particular, the numerous machines shown with examples include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

Transaction Management System

FIG. 1A illustrates a transaction management system, according to one or more embodiments. A transaction management system 100 as described by examples can be implemented on a network system (e.g., one or more servers), on a user device (e.g., user mobile device), or distributed between a network system and user device. With reference to FIG. 1A, examples provide for the system 100 to be implemented as a distributed system, where a mobile device of a user provides a user-interface to display output generated through use of the system 100.

In some implementations, a user can download an application on a user device to utilize the transaction management system as a service. A network computer system can subsequently communicate with the device to implement functionality such as described with an example of FIG. 1A. The user device can enable the user to view and interact with the interfaces, to view output that is generated by processes which may run either remotely on a network system or on the user device.

In examples, the system 100 includes processes represented in FIG. 1A by an account interface 110, onboarding component 112, a modeling component 120, a prediction component 130 and one or more user-interface components 140. As described with examples, the system 100 can be implemented for individual users to predict a net ledger value 135 for the user's transaction accounts 10, 12, where the predicted net ledger value represents a predicted amount of increase or decrease amongst the accounts 10, 12 at the end (e.g., last day) of a current cyclical time period. In a given cyclical time period, the net ledger value 135 can correspond to the sum total of debits and credits which occur with respect to the user's transaction accounts 10, 12 over the course of a predetermined cyclical time period (e.g., calendar month).

Unless stated otherwise, the net ledger value is a calculation that is made for the last day of the cyclical time period. However, the net ledger value can be calculated on different days of the cyclical time period being evaluated, including on first day of the cyclical time period.

By way of example, the net ledger value can represent the increase or decrease amongst each of the user's specified transaction accounts during the cyclical time period under evaluation. Stated otherwise, the net ledger value can represent the aggregate of credits less debits across the one or more transaction accounts 10, 12 of the user. Examples of transactions that affect the net ledger value include (i) debits, such as payments for rent, mortgage, utilities, groceries, dining, travel (e.g., gas), store purchases, credit card payments, ATM withdrawals, interest and penalty charges (for credit card account) and the like, and (ii) credits, such as deposits for paycheck, passive income, dividends, sales and the like. In the case where the cyclical time period is a calendar month, examples provide that the net ledger value can be determined in accordance with the following expression:

$$\text{Net Ledger Value} = \sum_{a=accounts} (\text{Balance}_a(\text{last day of the month}) -$$

Balance$_a$(First day of the month))

While numerous examples are described in which the cyclical time period is a calendar month, in variations, the cyclical time period can correspond to other time intervals, such as bi-monthly, quarterly, semi-annually, or annually.

In examples, the system 100 monitors the user's transaction accounts 10, 12 for transactions, and comparing detected transactions of the current month with transactions of prior months. A similarity can be determined between individual transactions of the current month and transactions of the prior month. Each transaction can contribute to the predicted net ledger value of the current month based at least in part on the similarity determination of the detected transaction with prior transaction.

In some examples, the system 100 uses the similarity determination made for each transaction to determine a normalcy of the transaction, where the normalcy can reflect a normal amount (e.g., matching a baseline transaction value determined from historical transaction) and an abnormal amount. The portions of detected transactions which are deemed abnormal can directly impact the net ledger value.

Still further, in some examples, the system 100 can predict the net ledger value by (i) determining an initial (or Day 1) net ledger value for the last day of a current month based on a historical transaction set that reflects normalcy for the user's accounts; (ii) over the course of the current month, detecting transactions that occur with respect to the user's linked accounts 10, 12; (iii) for each detected transaction, determining normalcy, such that each transaction is identified to include a normal amount and an abnormal amount; and (iv) adjusting the prediction of the net ledger value based at least in part on the initial net ledger value, the transactions that are detected to have occurred, and the abnormal amounts of the detected transactions.

Onboarding

In examples, the user can utilize the computing device to interact with an onboarding component 112 to create a service account. Alternatively, the user can access system 100 via a website to open a service account. Initially, the user can create a user profile 105 that references the user's service account with one or more transaction accounts that the user conducts transactions through. Through the onboarding component 112, the user can specify an account identifier for the transaction accounts, as well as login credentials for enabling remote access to each of the transaction accounts. By way of example, the user's transaction accounts can correspond to a user's checking account, saving account, credit card account, digital wallet or any other account where financial transactions are conducted by or on behalf of the user. At the completion of the onboarding process, the system 100 utilizes the user profile 105 to access the specified transaction accounts of the user.

Once onboarding is complete for the user, the account interface 110 accesses transaction information from specified transaction accounts 10, 12 of the user, using credentials, account identifiers and other information provided with the user profile 105. Initially, the account interface 110 retrieves historical transaction information 115 from the identified transaction account(s) 10, 12 of the user. The historical transaction information 115 can correspond to transactions conducted through the account(s) 10, 12 over a prior time interval that encompasses multiple prior cyclical time periods. The historical transaction data 115 is obtained for a span of N prior cyclical time periods (e.g., N=3). In implementation, the cyclical time period is a calendar month, and historical transaction data 115 spans, for example, three or more calendar months.

Model Development

Based on the historical transaction information 115, the modeling component 120 builds a transaction model 125 that is predictive of a net ledger value amongst the transaction accounts 10, 12 of the user at a future date that marks the end of a current cyclical time period (e.g., on last day or current month). In at least some examples, the predictive transaction model 125 includes or integrates a circular data structure representation 150 (see FIG. 1B), where transactions are analyzed over a cyclical time period. In implementations where the cyclical time period is a month, for example, the transaction model 125 can be structured to reflect 30.4 days. In variations, the modeling component 120 can modify the transaction model 125 to account for alternative cyclical time periods. The representative duration of the transaction model 125 can be expanded using historical transaction data that encompasses a longer period of time. For example, to model a cyclical time period of a desired length (1 month, 3 month, 1 year, etc.), the modeling component 120 utilizes historical transaction data 115 from a prior time interval that encompasses at least 2 or 3 cyclical time periods of the desired length. Thus, to model a 3 month period, the modeling component 120 utilizes historical transaction data from a prior time interval that encompasses 6 or 9 prior months. When the transaction model 125 expanded to cover cyclical time periods of greater length, the circular data structure representation provided with the transaction model 125 is increased in diameter. Likewise, if the cyclical time period of the transaction model is reduced (e.g., from 3 months to 1 month), the diameter of the circular data structure representation may similarly be reduced in diameter. Thus, the size of the circular data structure representation may be expanded or reduced to match a relative duration of a desired cyclical time period.

Initially, the modeling component 120 analyzes historical transaction data 115 to identify transactions that occur over a prior time interval that encompasses multiple cyclical time periods. To generate the transaction model for a normalized month, the modeling component 120 analyze historical transaction data 115 that spans over three prior months. The modeling component 120 determines a set of characteristics for each transaction that is identified from the historical transaction data, where the set of characteristics include a transaction value and a transaction date. In some examples, the transaction characteristics can also include one or more categorical designations for the transaction, based on a predetermined category schema. Such categorical designations include, for example, a category of the transaction (e.g., expenditure category, source of deposit transaction, etc.), a payee of a debit transaction, or a source of a credit transaction. In such variations, each transaction data set can be associated with additional characteristics that include such identified characteristics.

In examples, the transactions that are identified from the historical transaction data 115 are mapped by attributes (date, month) to the circular data structure representation of the transaction model 125. Each attribute of the mapped transaction can represent a dimension, such that transaction model 125 defines a cylindrical three-dimensional space. The mapping can involve normalizing the transaction date, such as by a ratio that reflects the difference in length between the month where the transaction occurred and the length of the normalized month. Further, the mapping can also normalize the transaction value based on a scale that reflects maximum and minimum amounts of identified clusters.

Based on similarities in the transaction data sets, the modeling component 120 determines a set of baseline transaction data sets, where each baseline transaction data set corresponds to one or more transactions that occurred in the prior time interval. Each baseline transaction data set can represent an expected transaction for a current or upcoming cyclical time period. Further, each baseline transaction data set can be associated with a characteristic time interval and a characteristic transaction value, where (i) the characteristic time interval is based on the transaction dates of each constituent transaction of the baseline transaction data set, when converted to the circular representation of the transaction model 125; and (ii) the characteristic transaction value is based on the transaction value of each constituent transaction of the baseline transaction data set.

In examples, the modeling component 120 clusters the transaction data sets that populate the cyclical data structure based on similarity. Each cluster of transaction data sets can correspond to a baseline transaction set that forms the basis for analyzing transactions in the current month. The clusters of the transaction data sets can be determined utilizing a clustering methodology (e.g., K-Means). Each determined cluster can include multiple transaction datasets that are deemed to satisfy a similarity condition or threshold. In determining clusters, the modeling component 120 compares transaction datasets by amount of transaction value and separation distance along the arc of the circular data structure representation. For example, the modeling component 120 can determine a similarity score between transaction data sets, based on a distance measurement between mapped transaction points. In implementations when K-Means methodology is used, for example, the similarity score can correspond to a silhouette coefficient, and the distance measurement between transactions that are being compared can take into account the transaction dates and amounts. The modeling component 120 can determine the number of clusters based on the silhouette coefficient method.

In variations, additional characteristics, such as category of the transaction (e.g., medical expenditure, reoccurring static expenditure, etc.) can also be quantified and used in determining similarity scores between transaction data sets. If the similarity scores satisfy a threshold value, the modeling component 120 determines that the compared transaction data sets can be clustered.

Figure 1B:
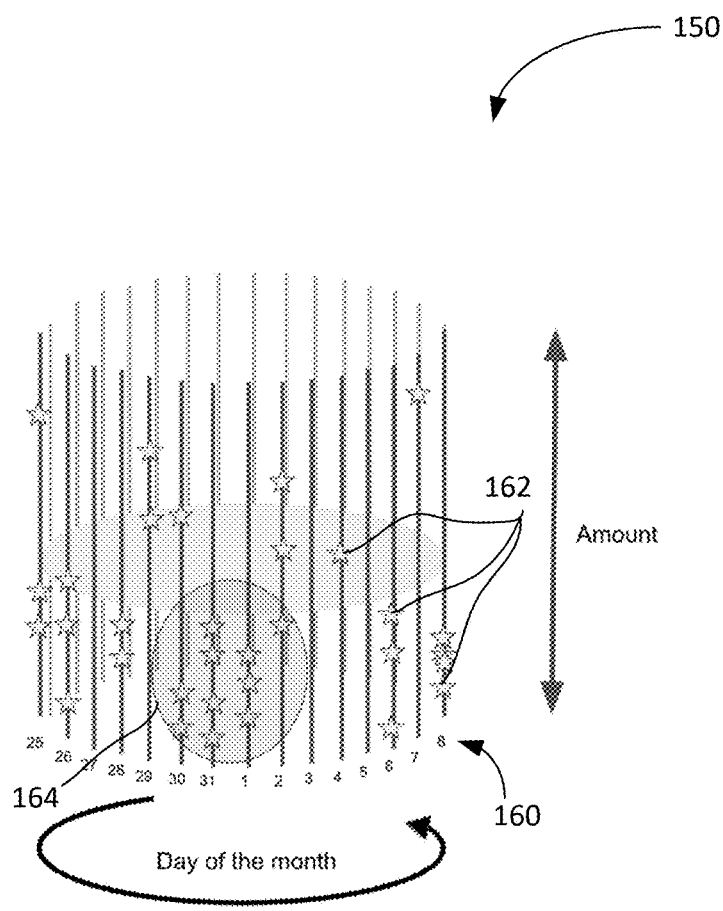
FIG. 1B illustrates a circular data structure representation for use with a transaction model, according to one or more embodiments.

FIG. 1B illustrates a circular data structure representation for use with a transaction model, according to one or more embodiments. As shown, the transaction model 125 can be represented as a three-dimensional data structure that maps individual transactions to a timeline representation of a cyclical time period. In an example of FIG. 1B, the circular timeline representation 160 can represent the timeline representation of, for example, a calendar month, where the calendar month includes radial segments that represent a calendar day. For alternative cyclical time periods, the circular timeline representation 160 can be provided more or fewer radial segments to match the number of days of the time period. Historical transactions 162 can be mapped to the circular timeline representation 160 by transaction date and value. The transaction date can place the transaction on the radial segment representing the calendar day. The transaction value can place the transaction at a height above the radial segment of the circular timeline representation. Clustering can be performed using, for example, the silhouette coefficient method, such that clusters 164 can identify sets of similar transactions.

In examples, each cluster 164 of transactions, as determined from the historical transaction data 115, can correspond to a baseline transaction data set. In this way, each baseline transaction data set can identify a set of similar transactions. In some examples, the baseline transaction data set can have a characteristic transaction amount and characteristic transaction date. The characteristic transaction value can be based on a median or average of the associated transaction value of each constituent transaction data set of the cluster. As described in greater detail, the characteristic transaction amount can represent a normalcy parameter of a represented transaction. The characteristic transaction date can be based on a midpoint between the radial positions of each transaction data set of the cluster.

Initial Net Ledger Value Determination

In examples, the prediction component 130 uses the historical transaction information 115 to predict the net ledger value 135 of the user's accounts 10, 12 for a current cyclical month. On the first day of the calendar month, the net ledger value is a predictive determination based entirely on the historical transaction data 115.

The NLV determination component can use the historical transaction information 115 to calculate the net ledger value 135 for N prior calendar months. The prediction of the net ledger value 135 of the current month can be based on the calculated net ledger value of prior months. For example, the net ledger value for the current month can be based on the median or average of the net ledger value calculated for prior months.

Stated otherwise, let $NLV_{D,N}$=the net ledger value of the accounts 10, 12 on the last day of the month, where D is the day of the calendar month where the net ledger value is calculated and ranges from 0 (on or before first day of calendar month) to LD (last day of calendar month), and N is the cyclical time period. Then on or before the first day of the current month, the initial day net ledger value 135 for the month can be determined using the expression provided below.

$$NLV_{0,N} = \text{MEDIAN}(NLV_{LD,N-3}, NLV_{LD,N-2}, NLV_{LD,N-1}) \quad (1)$$

Mapping Transactions in Current Period

During a current month, the account interface 110 can repeatedly (e.g., daily) access the user's transaction accounts 10, 12 to obtain transaction data 111 for the current month. Based on the current transaction data 111, the account interface 110 can identify transactions of the current month, where each detected transaction is characterized by attributes that include transaction date and transaction amount. Based on attributes of the detected transactions, the predicted net ledger value 135 can be adjusted. The prediction component 130 implements transaction matching logic 132 to match a detected transaction of the current month with one of the baseline transaction data sets identified by the transaction model 125. In examples, the matching is performed by determining that the newly detected transaction satisfies a similarity condition or threshold to one of the baseline transaction data sets of the transaction model 125. As an addition or variation, the matching can include determining which of the baseline transaction data sets the newly detected transaction is most similar to.

In examples, the prediction component 130 implements the transaction matching logic 132 to determine a similarity score between the detected transaction and each of the baseline transaction data sets. The similarity score can include determining a distance score as between the attributes of the detected transaction and each baseline transaction data set. In determining similarity, the detected transaction can be assigned to the cluster that has the highest similarity score.

According to some examples, the prediction component 130 can implement a K-Means methodology to determine which baseline transaction data set the detected transaction belongs to. In making the similarity determination, the transaction date of the detected transaction can be normalized and mapped to the circular timeline representation 160 for the current month. In determining the similarity of the transaction date with one of the baseline transaction data sets, the prediction component 130 can determine a distance measurement as between the newly detected transaction and the target baseline transaction data set, based on a comparison of the radial position of the detected transaction (representing the transaction date) and the centerline of a cluster (coinciding with the radial position represented by the characteristic transaction date). Further, for each baseline transaction data set, a distance between the radial position of each constituent transaction data set (representing an underlying date of a represented transaction) and the centerline of the respective cluster is determined. The average distance between each constituent transaction data set and the centerline of the respective cluster is then determined. The prediction component 130 can determines a similarity score as between a newly detected transaction and one of the baseline transaction data sets, where the similarity score is based on a comparison of the distance measurement for the newly detected transaction, and the average distance of the constituent data set. Depending on implementation, the determination of the similarity score can be repeated for each cluster of the transaction model 125.

Additionally for each newly detected transaction, the transaction amount can be compared to the characteristic transaction value of each cluster to determine another similarity score. If additional characteristics are used to compare transactions, additional similarity scores or measurements can be made. In some implementations, the similarity scores for the detected transaction can be summed or averaged (weighted or otherwise) in order to determine the appropriate cluster for newly detected transaction.

Transaction Normalcy Determination

Once the newly detected transaction is associated with a cluster 164 of transaction data, transaction normalcy is determined, where the amount of the transaction is separated into a normal amount and an abnormal amount. If the amount of the current transaction is equal to the characteristic transaction amount of the baseline transaction set, then no abnormal amounts are associated with the detected transaction. A transaction that is entirely normal can correspond to, for example, a static reoccurring expense, such as rent. If there is a different between the amount of the newly detected transaction and the characteristic transaction amount of the baseline transaction data set, then the difference is identified as an abnormal amount and separately associated with the transaction. The abnormal amount can be a positive or negative number, reflecting whether the detected transaction was greater than or less than characteristic transaction amount of the baseline data set.

The account interface 110 can retrieve current transaction data 111 from the account(s) 10, 12 on a repeated basis (e.g., daily) throughout the current month. The prediction component 130 analyzes the current transaction data 111 to identify new transactions. Each new transaction can be associated with a baseline transaction data set. Further, the prediction component 130 makes a normalcy determination for each detected transaction, such that each transaction is associated with each of a normal and abnormal transaction amount.

Net Ledger Value Update

As a current month progresses in days, the number of detected transaction increases, where each transaction is associated with a transaction date, a normal transaction amount and an abnormal transaction amount. On a given day m of a current month, the group (T) of transactions that have been detected as occurring through a given day (D) of the month, can be represented as follows:

$$T_m=[\{DT_1,NA_1\},\{DT_1,AA_1\} \ldots \{DT_{(m-1)},NA_{(m-1)}\},\\ \{DT_{(m-1)},AA_{(m-1)}\} \ldots \{DT_{(m)},NA_{(m)}\},\{DT_{(m)},\\ AA_{(m)}\}] \quad (2)$$

where m is a given day in the current month, DT is the transaction date of a transaction, NA is the normal amount calculated for the transaction, and AA is the abnormal amount of the transaction.

The NLV determination component can maintain an aggregate or summation of each of the normal amounts and the abnormal amounts of each transaction detected in the current month. The aggregate of the normal amounts (TNA) can be represented as follows:

$$TNA(D)=\Sigma^D NA \quad (3)$$

where D can range between 0 (before first day of month) and LD (last day of current month). The aggregate of the abnormal amounts (TAA) can be represented as follows:

$$TAA(D)=\Sigma^D AA. \quad (4)$$

In examples, the prediction component 130 predicts an updated net ledger value 137 on a given date in the current month based on a combination of the initial day net ledger value 135 and an analysis of transactions that have occurred up to the current day. The transaction analysis can determine the updated net ledger value 137 for the accounts 10, 12 on the last day of the month, based on (i) a weighted sum of the normal amount of the detected transactions (TNA(D)) and the initial day net ledger value 135, and (ii) a summation of the abnormal amounts (TAA(D)) of the transaction. The updated net ledger value 137 can be expressed as:

$$NLV(D)=f(D)*[NLV_0]+g(D)*TNA(D)+TAA(D) \quad (5)$$

where g(D) and f(D) are complementary coefficients, such that f(D)+g(D)=1. Each of f(D) and g(D) can thus be dependent on the day of the current month where the net ledger value 135 is being determined. In examples, the equations for f(D) and g(D) may be exponential. In one implementation, $$g(D) = \frac{e^{\frac{D}{P}} - e^{\frac{1}{P}}}{e^{\frac{N}{P}} - e^{\frac{1}{P}}} \quad (6)$$

where D is the day of the month, P=10, and N is the number of days in the month.

User Interface Component

In examples, the system 100 includes one or more user interface components that generate and provide interactive interfaces for displaying information that includes predictive determinations of the net ledger value 135, 137. In some examples, the user interface component 140 includes a calendar feature 142. The calendar feature 142 can indicate a status of individual transactions which have been determined to have occurred during a given month. As an addition or variation, the user interface component 140 can display the updated predicted ledger value 137 for the one or more accounts.

As an addition or variation, the user interface component 140 can include a graphic feature to indicate the predicted net ledger value 135 for the end of the current month. In an aspect, the user interface component 140 includes a dial or gauge feature 144 (see also FIG. 3) that graphically indicates whether the predicted ledger value 135 for the current cyclical time period will be positive or negative.

Transaction Model Update

In examples, transactions that are identified with the current transaction data 111 can be stored with a transaction data store 116 as historical transaction data set 115. The modeling component 120 can periodically update the transaction model 125 based on the updated historical transaction data set 115. The transaction model 125 can be updated with historical transaction data set 115 to have predictive accuracy of the baseline transaction data sets, by for example, providing additional constituent transaction data sets that narrow the span of the cluster. The addition of transactional data sets to the respective clusters can also improve the accuracy of the characteristic time interval and the characteristic transaction value associated with each baseline transaction data set. Additionally, over time, the updated historical transaction data set 115 can enable determination of new baseline transaction data sets, and removal of others.

Further, by increasing the length of the prior time interval, the modeling component 120 can extend the transaction model 125 to longer cyclical time periods. For example, the modeling component 120 can expand the size of the circular data structure representation, to encompass a larger cyclical time period (e.g., 3 months, 12 months, etc.). When the transaction model 125 is expanded to implement a larger circular data structure representation 150, the transaction model 125 can better identify variations in the baseline set of transactions, reflecting, for example, seasonal variations by the user, or behavioral patterns (e.g., the user shops every 3 months). To illustrate, the historical transaction data 115 can encompass three or more years of transaction data. The modeling component 120 can configure the transaction model 125 to represent a year, based on the prior three years of transactions. Over the course of a year, changes resulting from seasonal context can be identified and better predicted for a current year. For example, the transaction model 125 can detect that in January of prior years, the user has made large payment towards a credit card account that was a debit from the monitored account. The modeling component 120 can categorize or separately cluster the transactions to reflect the seasonal activity by the user (e.g., the user used credit cards to shop for gifts during the holidays).

Optimizing User Objectives

Among other advantages, examples as described enable users to optimize use of available resources to further personal objectives. In examples, the user profile 105 can record information that reflects personal objectives of the user. For example, the user profile can reflect the user's interest in eliminating debt, or creating a savings plan. The information about the user objectives can be determined from, for example, user feedback, behavioral analysis, or inferred based on the historical transaction information 115 of the user. In the latter case, if the user has a disproportionate amount of debt, the assumption can be made that the user would benefit from debt relief.

In examples, the system 100 can include processes represented by optimization and recommendation engine 138. In examples, the optimization/recommendation engine 138 can access the user profile 105 to determine user objectives. The optimization/recommendation engine 138 can utilize the predicted net ledger values 135, 137 for the last day of a current time period to determine an amount that the user can dedicate to an objective. In particular, an objective to pay down debt can be optimized by making payments towards the principal as soon as possible. The optimization/recommendation engine 138 can identify a credit account (e.g., one with highest interest rate) to pay down with an available amount in the user's account, based on the determination that if the available amount is reduced with the additional transaction, the predicted transaction value 139 for the user's account(s) 10, 12 will remain positive. Further, the predicted ledger value 135, 137 can be used by the user to pay debt days or weeks sooner in the month, thereby reducing the interest. For example, if the updated predicted ledger value 137 indicates the user will have X left over at the end of the month, the optimization recommendation engine 138 can use the profile information 105 and the predicted ledger value 137 to generate a recommendation for the user to make an immediate payment (e.g., X/2) towards interest accruing debt.

Methodology

Figure 2A:
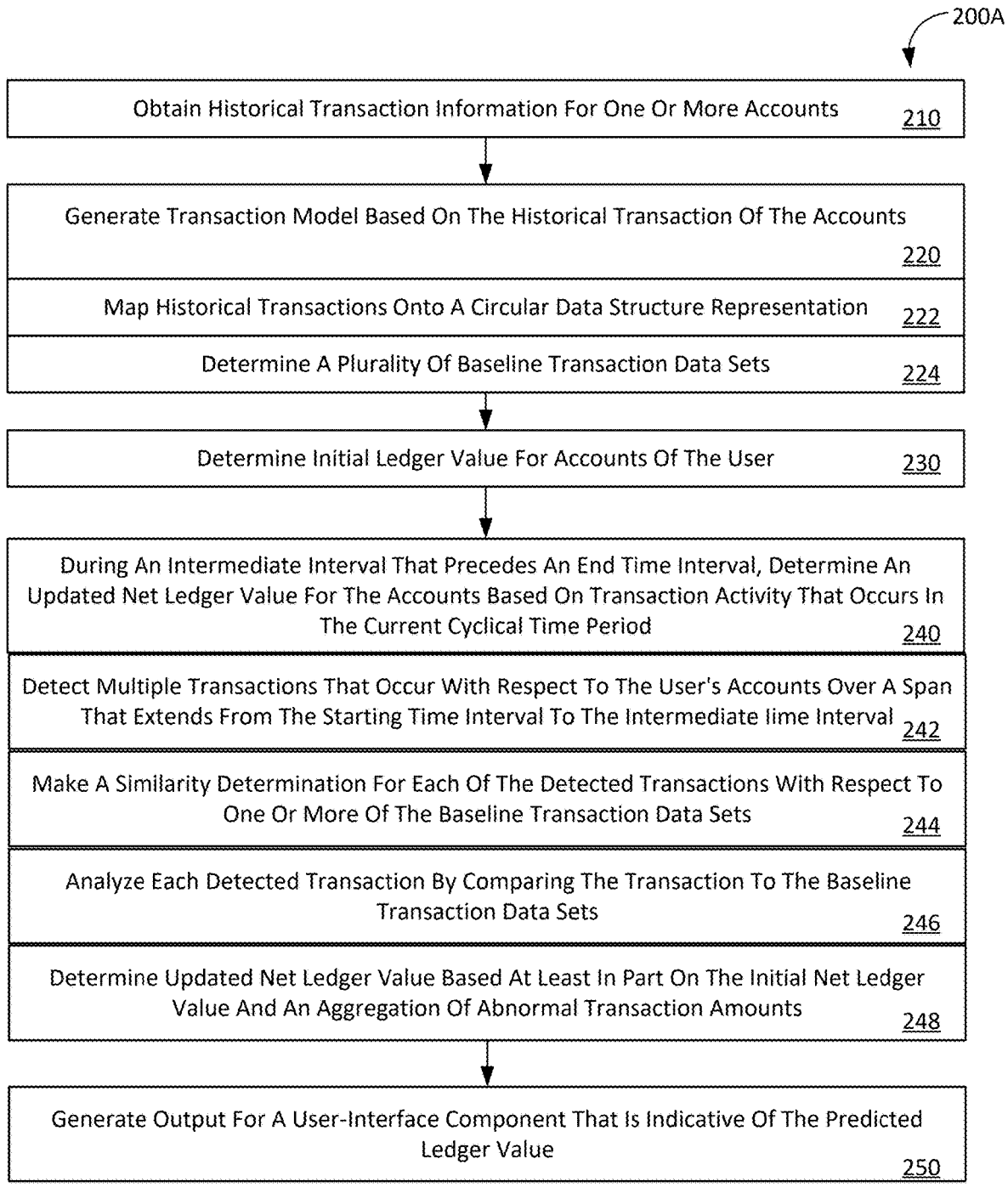
FIG. 2A illustrates an example method for determining a predicted ledger value for an account, according to one or more embodiments.
Figure 2B:
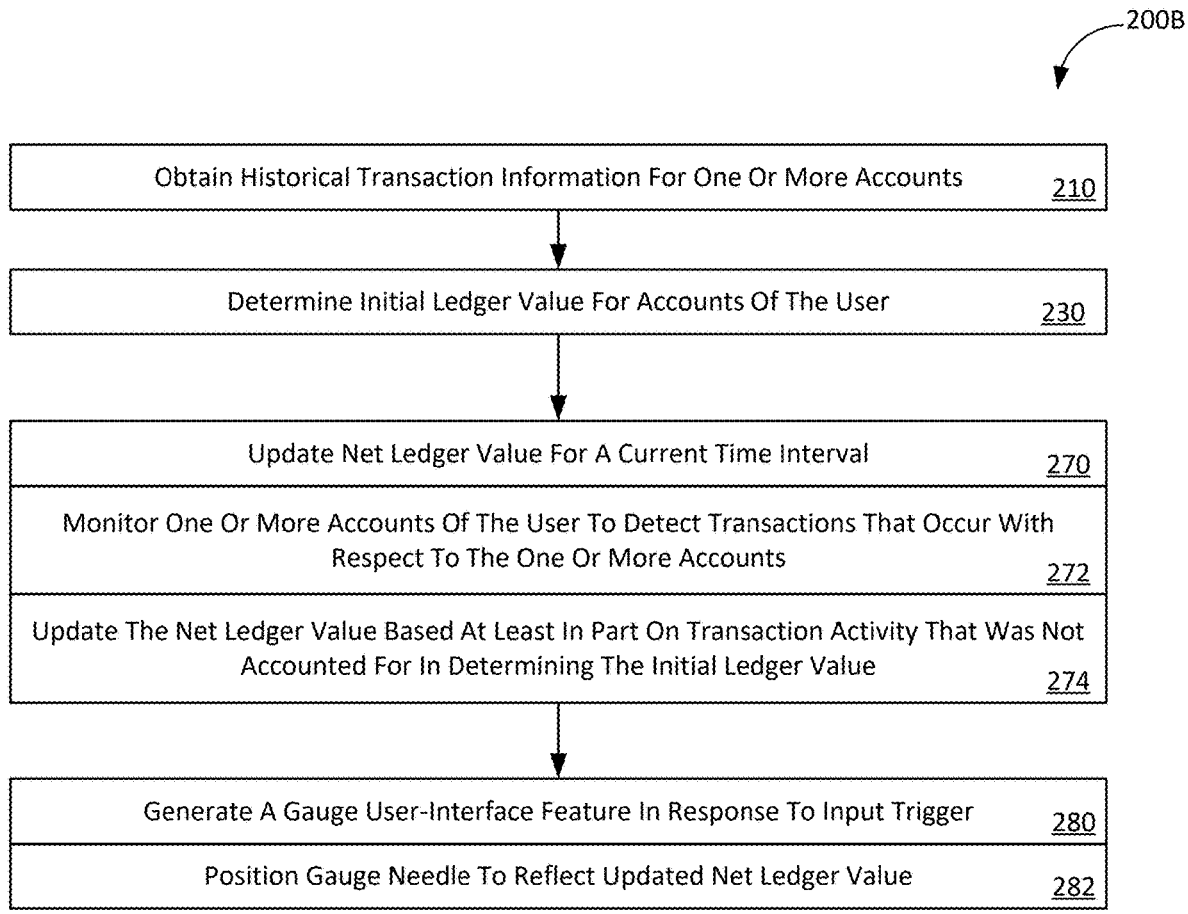
FIG. 2B illustrates an example method generating a user-interface feature to display an updated net ledger value, according to one or more embodiments.

FIG. 2A illustrates an example method for determining a predicted ledger value for one or more user accounts, according to one or more embodiments. FIG. 2B illustrates an example method generating a user-interface feature to display an updated net ledger value, according to one or more embodiments. In describing examples of FIG. 2A and FIG. 2B, reference may be made to elements of FIG. 1A and FIG. 1B for purpose of illustration.

With reference to FIG. 2A, an example method 200A includes, in step 210, obtaining historical transaction information for one or more accounts of the user, over a prior time interval that includes multiple prior cyclical time periods. The historical transaction information identifies a plurality of transactions, wherein each of the plurality of transactions are associated with a transaction amount and a transaction date. For example, the account interface 110 acquires and accesses user credentials from the profile store 105. The account interface 110 uses the credential information to log into user's account over one or more networks, and to retrieve historical transaction information 115 for a prior time interval. From the historical transaction information 115, a plurality of historical transactions are identified, where each historical transaction is associated with a transaction amount and a transaction date.

In step 220, a transaction model is generated based on the historical transactions of the accounts 10, 12. For example, the accounts 10, 12 can correspond to a primary checking account, a secondary checking account, a savings account, and one or more credit card accounts. The system 100 implements the method 200A to generate the transaction model 125 for the user's accounts 10, 12, over a span of N prior calendar months, where N>=1, and more preferably, N>=3.

In determining the transaction model, in step 222, each of the plurality of historical transactions is mapped onto a circular data structure representation 150 of a cyclical time interval. Each transaction is mapped by radial position and height. The radial position for a transaction coincides with a time interval representing the transaction date. As described, a single circular timeline can be used to represent a cyclical time period, such as a calendar month, where the time intervals represent a calendar day. The individual time intervals (e.g., calendar month) can correspond to a radial segment of the circular timeline. Further, the corresponding position of the mapped transaction can be associated with a height above the circular timeline, where the height reflect the transaction amount. For example, each historical transaction can include coordinates that indicate, for example, a calendar day of the transaction and a transaction amount. The circular data structure representation allows for transactions that occur over multiple cyclical time interval to be mapped in a view where each cyclical time interval is inherently superimposed.

In step 224, a plurality of baseline transaction data sets are determined, where each baseline transaction data set corresponds to a set of multiple transactions that are deemed similar to one another based on the corresponding transaction dates and amounts. In some examples, a K-Means clustering process is used to identify clusters amongst the plurality of mapped transactions, where the clusters are determined based on their relative proximity to one another on the circular data structure representation. The distance measurements between transaction points can be determined either as a radial distance or straight line approximate. The association of each historical transaction with one of the clusters can also be evaluated to ensure that each historical transaction is associated with the best cluster. In examples, each cluster of transactions (representing the baseline transaction data set) can be identified by a proximity threshold (e.g., transactions which are sufficiently proximate to meet a proximity threshold). In variations, the clustering can determine the proximity threshold dynamically, based on the historical transaction data set. In variations, a silhouette coefficient method can be used to associate individual historical transactions with a cluster. The silhouette method can be based on the average distance between the historical transaction and each transaction of the candidate cluster, as compared to the average distance between the historical transaction and each transaction of a transaction set that is excluded from the candidate cluster (e.g., transactions of other clusters, or of all other transactions).

In variations, historical transactions of a user can be evaluated to determine an optimal number of clusters. As described, the transactions can be mapped to the circular data structure representation 150. The historical transactions can be arranged into a range of clusters, ranging, for example, from 2 to 100. Each arrangement of the historical transaction set can be sequentially evaluated for its silhouette coefficient. To determine the optimal number of clusters, a silhouette coefficient is determined for each cluster, where the silhouette coefficient is based at least in part on a comparison (e.g., difference) of (i) an average distance measurement between each transaction point of the cluster and every other transaction point of the cluster; and (ii) an average distance measurement between each point of the cluster and every transaction point of a transaction data set (e.g., next nearest cluster or all other clusters) that is not part of that cluster. For each arrangement, a sum of the silhouette coefficients for all clusters is determined. The optimal number of clusters can be based on the arrangement with the highest sum of silhouette coefficients.

Accordingly, as described with some examples, a plurality of baseline transaction data sets can be determined for the user accounts 10, 12, where each baseline transaction data set is based on a cluster of historical transactions. Further, each baseline transaction data set can be associated with a characteristic transaction date and transaction amount. For example, the characteristic transaction date and amount can be based on the coordinates of a mid-point of the respective cluster with respect to the circular data structure representation.

On or before a start interval of a current cyclical time period, in step 230, the method 200A can determine an initial net ledger value for the accounts 10, 12 of the user (Equation 1). The initial net ledger value can be predictive of the change in the accounts 10, 12, on the end interval of the current cyclical time period. Thus, for example, where the cyclical time period is a current or upcoming month, the system 100 can determine the initial net ledger value on or before the first day of the month, where the initial net ledger value is predictive of the change in amounts to the accounts 10, 12 on the final day of the current or upcoming month. As described, the initial net ledger value ($NLV_{ON}$) can be based on an average or median of the actual net ledger value of prior months, as determined by historical transaction data. The net ledger value of prior months can be determined as, for example, the change in amounts of the account 10, 12 between the first and last day of each prior month of the prior time interval.

During an intermediate interval that precedes the end time interval, method 200A includes, in step 240, the system 100 determines an updated net ledger value for the accounts 10, 12 based on transaction activity that occurs in the current cyclical time period. To determine an update to the predicted net ledger value, in sub-step 242, the system 100 detects multiple transactions that occur with respect to the one or more accounts 10, 12 over a span that extends from the starting time interval to the intermediate time interval. Each detected transaction can be processed to identify a transaction date and a transaction amount. The system 100 can monitor the one or more accounts 10, 12 to detect transactions that occurred during a current cyclical time period. For example, the account interface 110 can utilize credentials specified by a user profile 105, to automatically access the one or more accounts, in order to retrieve transaction data. In variations, the account interface 110 can indirectly receive transaction data of the one or more accounts, using a third-party provider. The system 100 can analyze the transaction data to detect transactions as they occur during the current cyclical time period. For example, the system 100 can detect transactions on the day of, or on following business day, after the occurrence of the transaction.

Further, sub-step 244 provides that a similarity determination is made for each of the detected transactions with respect to one or more of the baseline transaction data sets. In some examples, the similarity determination is made for each detected transaction, with respect to the set of baseline transactions. The similarity determination can be based in part on the characteristics of the detected transaction. Each detected transaction can be mapped to the circular data structure representation 150 using the detected transaction date and amount. Further, a silhouette coefficient methodology can be used to associate the newly detected transaction with one of the baseline transaction data sets. In examples, the baseline transaction data set can be associated with a transaction date and amount, which can correspond to, for example, a center point of a corresponding cluster of transaction points. In a silhouette method, a distance measurement can be made between the transaction point for the newly detected transaction and the center point of each cluster. Further, in some variations, the distance measurement for the transaction point of the newly detected transaction can be compared to distance measurements of other transactions of the cluster with respect to the center point of the cluster. Accordingly, the determination of whether the newly detected transaction is part of the particular transaction cluster can be based at least in part on the comparison of the distance measurement of the transaction point of the newly detected transaction, and the distance measurement (or average thereof) of all of the other transactions of the cluster with respect to the center point.

In some examples, sub-step 246 provides that each detected transaction is analyzed by comparing the transaction to the baseline transaction data sets. In some examples, each detected transaction is mapped to the circular data structure representation 150 and associated with a best cluster. Once the best cluster is identified for the transaction, normalcy analysis is performed by comparing the transaction to the corresponding baseline transaction data set to determine a normal and/or abnormal portion of the transaction. For example, if the newly detected transaction is greater than the characteristic transaction value of the baseline transaction data set, then the excess amount can be identified as the abnormal amount. If the newly detected transaction is less than the characteristic transaction value of the baseline transaction set, then the shortfall amount is identified as the abnormal amount.

In sub-step 248, the updated net ledger value is determined as being based at least in part on the initial net ledger value and an aggregation of abnormal transaction amounts (e.g., see Equation 4). Further, in some variations, the updated net ledger value can be based on an aggregation of the normal amounts detected for each transaction (see Equation 3).

Still further, in some variations, the updated net ledger value is determined by determining (i) an expected transaction activity for the current cyclical time period (e.g., see Equation 1, representing the initial net ledger value); (ii) an aggregation of transaction activity that occurred which was expected or "normal" (e.g., see Equation 3); and (iii) an aggregation of transaction activity which was not expected or "abnormal" (e.g., see Equation 4). Over the course of a month, the expected transaction activity and the aggregation of normal transaction activity can be weighted and summed, where the respective weights can be based at least in part on the time interval during the cyclical time period where the updated net ledger value is being determined. By separately accounting for expected transaction activity and normal transaction activity in the determination of the updated net ledger value, the updated net ledger value can reflect instances when a transaction that was otherwise expected (e.g., one that occurred in prior months) does not occur.

Additionally, in step 250, method 200A provides for configuring the graphic feature to be indicative of the updated net ledger value. In examples, the graphic feature can be in the form of a gauge feature, having a maximum and minimum value, with a zero position that is the midpoint of the gauge feature 144. The gauge feature 144 can include a needle that can be angularly positioned to reflect the updated net ledger value at a given interval of the current cyclical time period.

As described with various examples, a user can view the graphic feature to determine a current projection of the net ledger value for the user's accounts 10, 12. As described with examples of FIG. 3A and FIG. 3B, the graphic feature can indicate whether the net ledger value is expected to be positive or negative.

With reference to FIG. 2B, an example method 200B includes step 210, wherein historical transaction information is obtained for one or more accounts of the user. Further, the example method includes step 230, where an initial ledger value is determined for the one or more accounts of the user, based on the historical transaction information.

Further, method 200B provides that in step 270, the net ledger value is updated for a current time interval by, in step 272, monitoring the one or more accounts of the user to detect transactions that occur with respect to the one or more accounts, and in step 274, updating the net ledger value based at least in part on transaction activity that was not accounted for in determining the initial ledger value.

In examples, method 200B includes, in step 280, responding to an input trigger to generate a gauge user-interface feature 144. The gauge user-interface feature 144 can be structured to include a needle that is angularly positionable between a minimum value and a maximum value. In sub-step 282, the gauge user-interface 144 can position the needle to reflect the updated net ledger value for the current time interval.

Example Interfaces

Figure 3:
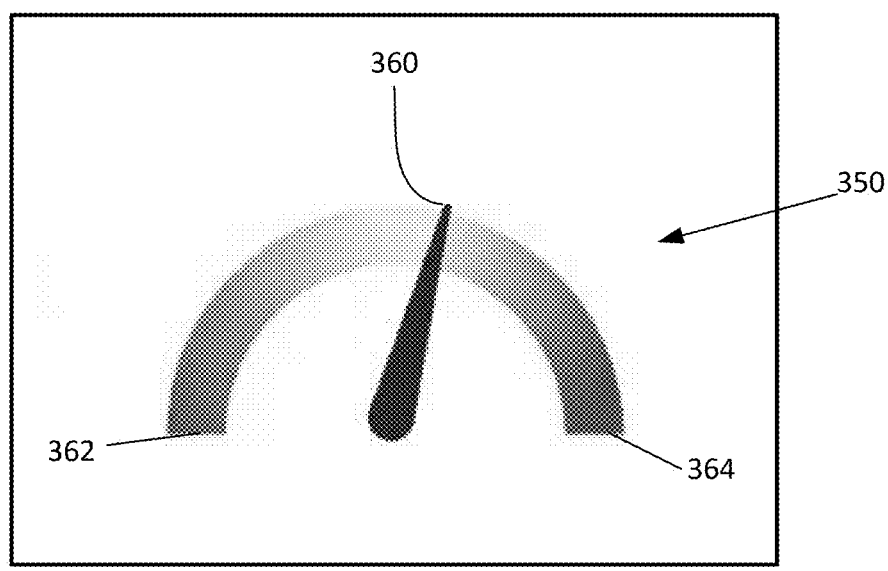
FIG. 3 illustrates an example user-interface feature for one or more accounts of a first user, according to one or more embodiments.

FIG. 3 illustrates an example user-interface feature for one or more accounts of a first user, according to one or more embodiments. In describing an example interface of FIG. 3, reference may be made to elements of FIG. 1A and FIG. 1B for purpose of illustrating suitable components and functionality for implementing features as described.

With reference to an example of FIG. 3, a gauge interface 350 can include a gauge needle 360, a minimum boundary value 362 and a maximum boundary value 364. The minimum and maximum boundary value 362, 364 can reflect a scale that is based on the historical transactions of the user. In some examples, the scale may be based on a non-linear function that utilizes each of the minimum and maximum boundary values 362, 364.

The gauge interface 350 may be configured to reflect a range of values for the predicted net ledger value, ranging from a minimum boundary value 362 to a maximum boundary value 364. A zero value can be positioned at the midpoint of the range. Further, the gauge interface 350 can be configured so that the needle 360 moves rightward when the predicted net ledger value is updated to increase from a prior instance. Likewise, the gauge interface 350 can be configured to move leftward when the predicted net ledger is updated to decrease from a prior instance. Further, in examples, when the predicted ledger value is updated, the position of the gauge needle 360 can be changed to reflect the update. If the predicted ledger value goes from positive to negative, for example, the gauge needle 360 can go from being proximate to the right boundary to being proximate to the left boundary. Likewise, if the predicted ledger value goes from negative to positive, the gauge needle 360 can go from being proximate to the left boundary to being proximate to the right boundary.

As described with various examples, the predicted ledger value for the end of a current cyclical time period can fluctuate based on transactions that are detected through one or more accounts. For example, in a current month, the predicted ledger value can initially be determined from the expected transaction values of the expected transaction for the current month. As the month progresses, transactions are detected and analyzed against the expected transactions. Based on the comparison, the predicted ledger value is updated. For example, if the transaction value of a debit transaction is less than what is expected, the predicted ledger value may increase. Likewise, if the transaction value of the debit transaction is greater than what was expected, the predicted ledger value may decrease. In this way, the predicted ledger value can be repeatedly or continuously updated throughout the current month, based on transaction values of detected transactions as compared to the expected values for such transactions.

In examples, the gauge interface 350 can be scaled or otherwise configured specifically for the user account(s) 10, 12. To scale the gauge interface, in some examples, the system 100 determines the maximum/minimum (or alternatively the maximum absolute value) of the net ledger value for one or more prior cyclical time periods of a prior time interval. The system 100 can base the negative/positive boundaries 362, 364 of the gauge interface 350 on the determined maximum/minimum value for the net ledger value in the prior time interval. For example, the negative/positive boundaries 362, 364 can be based on a scaler multiple of the maximum/minimum net ledger value for a prior month, within a given time interval (e.g., prior 3 months or 6 months). The negative and positive value for the scaled maximum/minimum net ledger value can be assigned to the negative and positive boundaries 362, 364.

As an addition or variation, the system 100 can base the negative/positive boundaries 362, 364 on an average or median of the absolute value of the net ledger value of multiple prior months, over a prior time interval (e.g., 6 months, 1 year). Still further, in some variations, the system 100 can determine the negative/positive boundaries 362, 364 by selecting the net ledger value that is a 2 or 3 standard deviations from the mean value, where the mean value is determined by the absolute value of the net ledger value of multiple prior months. The negative and positive determination of the determined value can be set to the respective negative/positive boundaries.

The gauge needle 360 can be displaced angularly between the negative and positive boundaries in accordance with the scale reflected by the respective values of the negative and positive boundaries. Thus, for example, the amount of angular displacement caused by a given change to the predicted ledger value can vary based on the scale of the gauge interface 350, and the scale of the gauge interface 350 can be account specific.

Further, in examples, the gauge-interface 350 can be updated for the user based on historical information. When a current cyclical time period ends, the transactions that are detected in the current month can be added to the historical transaction set. Older transactions can also be removed. For example, the prior time interval from which past transactions are used as historical transactions to determine the transaction model 125 can be a rolling window of time, such that after completion of a current month, transactions of the oldest month are removed from the historical data set 115. Alternatively, newer transactions can be weighted more than older transactions. The transaction model 125 can be updated, and the gauge interface 350 can reflect different negative and positive values 362, 364, as well as a different scaling factor, based on, for example, the amounts of the detected transactions in the updated prior time interval.

Hardware System

Figure 4:
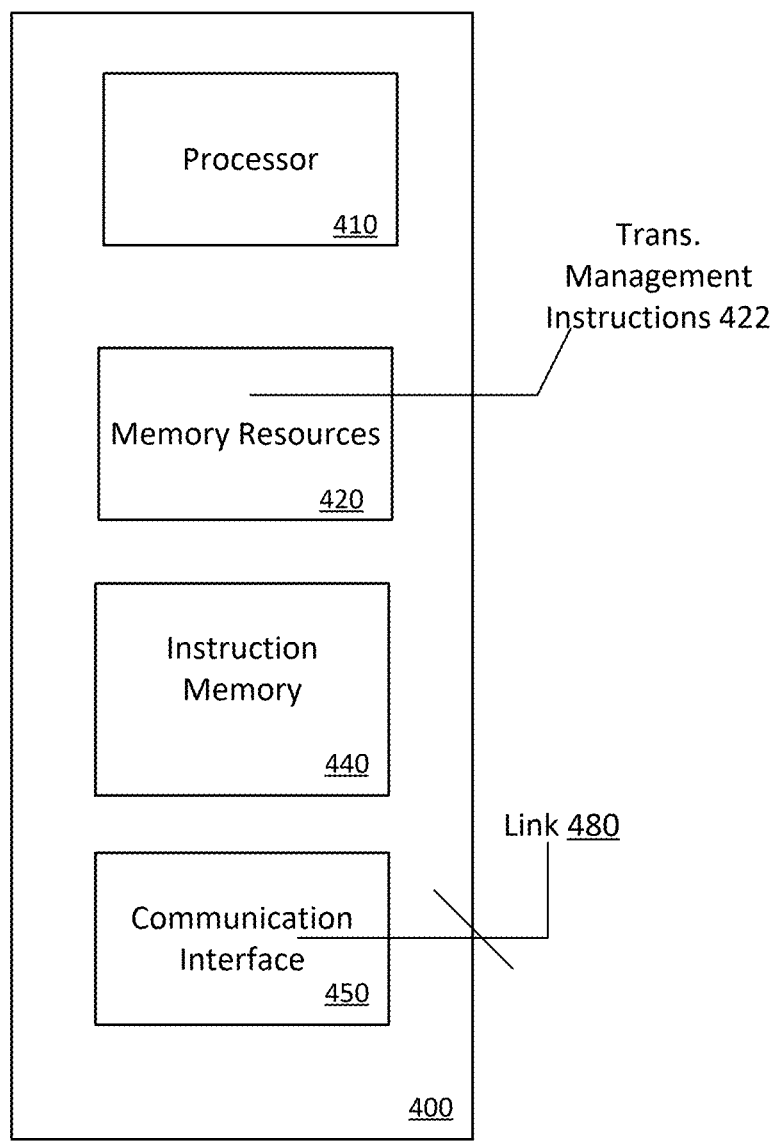
FIG. 4 illustrates a computing system for use in implementing one or more embodiments.

FIG. 4 illustrates a computer system on which one or more embodiments can be implemented. A computer system 400 can be implemented on, for example, a server or combination of servers. For example, the computer system 400 may be implemented to provide the transaction management system 100, and to perform methods such as described with FIG. 2A and FIG. 2B.

In one implementation, the computer system 400 includes processing resources 410, memory resources 420 (e.g., read-only memory (ROM) or random-access memory (RAM)), one or more instruction memory resources 440, and a communication interface 450. The computer system 400 includes at least one processor 410 for processing information stored with the memory resources 420, such as provided by a random-access memory (RAM) or other dynamic storage device, for storing information and instructions which are executable by the processor 410. The memory resources 420 may also be used to store temporary variables or other intermediate information during execution of instructions to be executed by the processor 410.

The communication interface 450 enables the computer system 400 to communicate with one or more user computing devices, over one or more networks (e.g., cellular network) through use of the network link 480 (wireless or a wire). Using the network link 480, the computer system 400 can communicate with one or more computing devices, specialized devices and modules, and/or one or more servers.

In examples, the processor 410 may execute transaction management instructions 422, stored with the memory resources 420, in order to enable the computing system to implement aspects of the transaction management system 100 as described with an example of FIG. 1A. Further, the processor may execute transaction management instructions 422 to implement methods such as described with FIG. 2A and FIG. 2B.

As such, examples described herein are related to the use of the computer system 400 for implementing the techniques described herein. According to an aspect, techniques are performed by the computer system 400 in response to the processor 410 executing one or more sequences of one or more instructions contained in the memory 420. Such instructions may be read into the memory 420 from another machine-readable medium. Execution of the sequences of instructions contained in the memory 420 causes the processor 410 to perform the process steps described herein. In alternative implementations, hard-wired circuitry may be used in place of or in combination with software instructions to implement examples described herein. Thus, the examples described are not limited to any specific combination of hardware circuitry and software.

Figure 5:
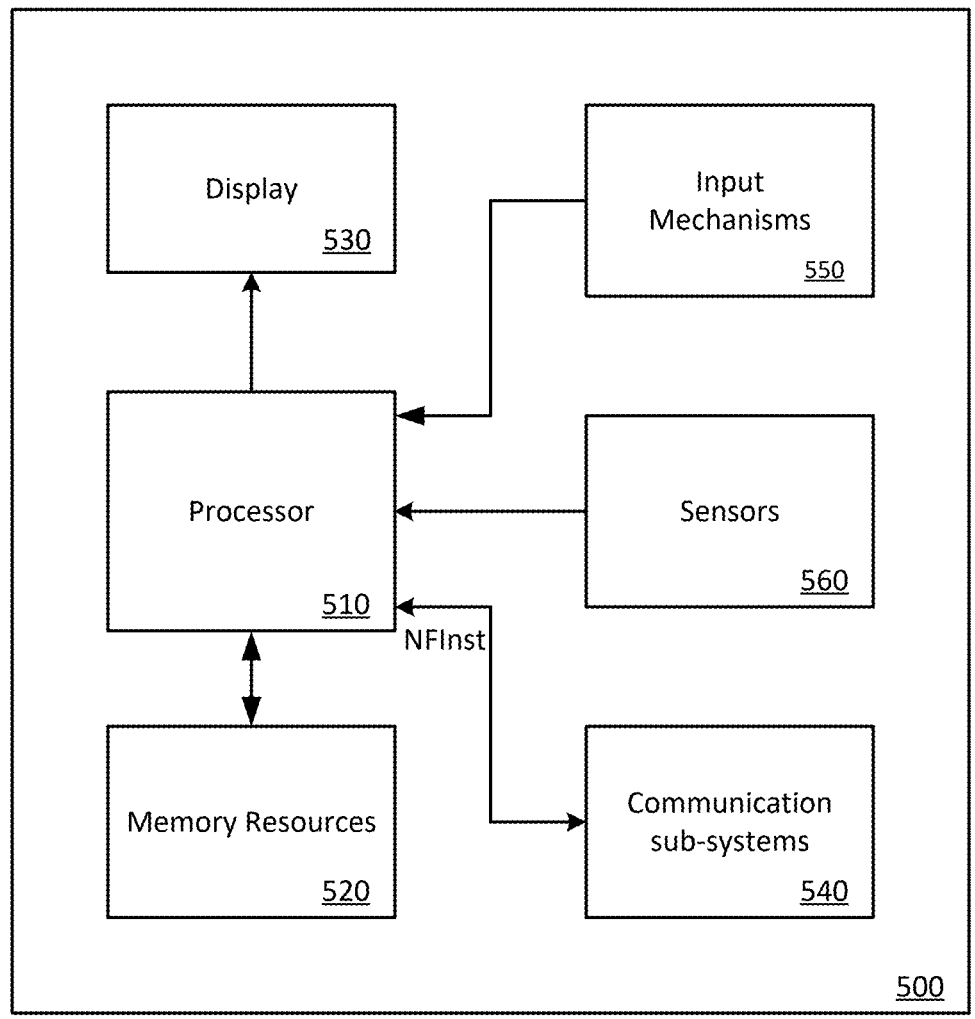
FIG. 5 is a block diagram that illustrates a device system upon which examples such as described herein may be implemented.

FIG. 5 is a block diagram that illustrates a mobile computing device upon which examples described herein may be implemented. In one example, a mobile computing device 500 may correspond to a device that can roam and utilize a local wireless network (e.g., home network with Wi-Fi access point) and/or wireless wide area network (e.g., cellular). Accordingly, in some variations, the mobile computing device 500 may be capable of cellular voice or data usage, such as used for telephony, messaging, and/or data services. By way of example, the mobile computing device 500 can correspond to a smartphone, multifunctional device, tablet, wearable computing device, netbook or laptop. In an example of FIG. 5, the mobile computing device 500 includes a processor 510, memory resources 520, a display device 530 (e.g., such as a touch-sensitive display device), one or more communication sub-systems 540 (including wireless communication sub-systems), input mechanisms 550 (e.g., an input mechanism can include or be part of the touch-sensitive display device), and one or more sensors 560 (e.g., location detection mechanisms such as GPS component). In one example, at least one of the communication sub-systems 540 sends and receives cellular data over data channels and voice channels.

The processor 510 can be configured with software and/or other logic to perform one or more processes, steps and other functions described with implementations, such as described with aspects of transaction management system 100, and example methods of FIG. 2A and FIG. 2B. The processor 510 can be configured, with instructions and data stored in the memory resources 520, to operate a computing system on which a transaction management system 100 such as described with FIG. 1A is implemented, as well as to perform methods of FIG. 2A and FIG. 2B.

CONCLUSION

It is contemplated for examples described herein to extend to individual elements and concepts described herein, independently of other concepts, ideas or system, as well as for examples to include combinations of elements recited anywhere in this application. Although examples are described in detail herein with reference to the accompanying drawings, it is to be understood that the concepts are not limited to those precise examples. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude having rights to such combinations.

What is claimed is:

1. A network computer system comprising:
one or more processors;
a memory communicatively coupled to the one or more processors, the memory storing a set of instructions;
wherein the one or more processors execute the set of instructions to, perform operations for providing, on a computing device of a user, in conjunction with an interactive user-interface, a scaled and dynamically responsive graphic feature that is indicative of a net ledger value of a transaction account of a user, the net ledger value predicting a sum total of debits and credits to the transaction account on a future date that coincides with a final day of a current month, wherein the operations further comprise:
communicating, over one or more networks, with the transaction account of the user to obtain historical transaction information for a prior time interval that includes multiple prior months, the historical transaction information identifying a plurality of transactions that credited to or debited from the transaction account, wherein each of the plurality of transactions are associated with a transaction amount and a transaction date;
generating a transaction model for a normalized time interval by (i) analyzing historical transaction information that spans the prior months to determine a set of characteristics for each transaction of the historical transaction information; (ii) based in part on the determined set of characteristics for each transaction of the historical transaction information, normalizing the determined set of characteristics of each of the historical transactions for a difference in length between a prior month in which the historical transaction occurred and the normalized time interval; (iii) mapping each of the plurality of transactions onto a cylindrical, three-dimensional space that is based in part on a circular data structure representation of a cyclical time period representing a month when the transaction occurred, wherein each mapped transaction is associated with a corresponding position on the circular data structure that is based at least in part on (a) a radial position that indicates a time interval during one of the prior months that coincides with the associated transaction date, and (b) a height that is based on the associated transaction amount; and (iv) determining a plurality of baseline transaction data sets, each baseline transaction data set corresponding to a set of multiple transactions that are deemed similar to one another based on the corresponding positions associated with each of the multiple transactions with respect to the circular data structure representation;
on or before a start interval of a current month, predicting, based on the normalized set of characteristics of each transaction of the historical transaction information, an initial net ledger value for the transaction account of the user for a final day of the current month;
wherein during a given day of the current month, the operations further comprise generating, on the computing device of the user, the scaled and dynamically responsive graphic feature to be indicative of a predicted net ledger value of the transaction account on the final day of the current month, by:
detecting multiple transactions that occur with respect to the transaction account in a span that extends from a first day of the current month to the current day;
for each of the multiple detected transactions, determining a similarity of the transaction to one or more of the baseline transaction data sets;
based on the determination of similarity of the transaction to one of the baseline transaction data sets, updating the predicted net ledger value based on the detected transaction;
dynamically configuring the graphic feature to represent a gauge having a gauge needle that is angularly positionable between a maximum value and a minimum value, the angular position reflecting the updated, predicted net ledger value, scaled according to a scaling factor that is specific to transaction amounts of the user; and
based on the predicted net ledger value as indicated by the graphic feature, enabling the user to perform, through the user-interface, a recommended action to optimize an objective of the user for the transaction account.

2. The network computer system of claim 1, wherein during the span of the current month, the operations further comprise:
determining an abnormal portion of the amount of each of the multiple transactions; and
predicting the net ledger value based at least in part on an aggregate of the abnormal amounts of each detected transaction.

3. The network computer system of claim 2, wherein during the span of the current month, the operations further comprise:
based on the determined similarity, determining a normalcy of the transaction, the normalcy identifying each of (i) a normal portion of a corresponding transaction amount, and (ii) the abnormal portion of the corresponding transaction amount.

4. The network computer system of claim 3, wherein during the span of the current month, the operations further comprise:
determining, for each transaction of the multiple transactions, the similarity of the transaction to one or more of the base transaction data sets, including mapping the transaction to the cylindrical, three-dimensional space, based on a date and amount of the transaction, and then calculating a similarity of the transaction to other historical transactions based on a proximity the transaction to one or more historical transactions that are also mapped to the cylindrical three-dimensional space.

5. The network computer system of claim 1, wherein the operations further comprise:
in response detecting a transaction during the current cyclical time period, pivoting the gauge needle by an angular amount that is based at least in part on a change to the updated net ledger value resulting from the detected transaction.

6. The network computer system of claim 1, wherein the operations further comprise:
displaying an amount that is based on the updated net ledger value along with the graphic feature.

7. A non-transitory computer-readable medium that stores instructions, which when executed by one or more processors of a computer system, cause the computer system to perform operations that include:
providing, on a computing device of a user and in conjunction with an interactive user-interface, a scaled and dynamically responsive graphic feature that is indicative of a net ledger value of a transaction account of a user, the net ledger value predicting a sum total of debits and credits to the transaction account on a future date that coincides with a final day of a current month;
wherein providing the scaled and dynamically responsive graphic feature includes:
communicating, over one or more networks, with the transaction account of the user to obtain historical transaction information for a prior time interval that includes multiple prior months, the historical transaction information identifying a plurality of transactions that credited to or debited from the transaction account, wherein each of the plurality of transactions are associated with a transaction amount and a transaction date;
generating a transaction model for a normalized time interval by (i) analyzing historical transaction information that spans the prior months to determine a set of characteristics for each transaction of the historical transaction information; (ii) based in part on the determined set of characteristics for each transaction of the historical transaction information, normalizing the determined set of characteristics of each of the historical transactions for a difference in length between the prior month in which the historical transaction occurred and the normalized time interval; (iii) mapping each of the plurality of transactions onto a cylindrical, three-dimensional space that is based in part on a circular data structure representation of a cyclical time period representing a month when the transaction occurred, wherein each mapped transaction is associated with a corresponding position on the circular data structure that is based at least in part on (a) a radial position that indicates a time interval during one of the prior months that coincides with the associated transaction date, and (b) a height that is based on the associated transaction amount; and (iv) determining a plurality of baseline transaction data sets, each baseline transaction data set corresponding to a set of multiple transactions that are deemed similar to one another based on the corresponding positions associated with each of the multiple transactions;
on or before a start interval of a current month, predicting, based on the normalized set of characteristics of each transaction of the historical transaction information, an initial net ledger value for the transaction account of the user for a final day of the current month;
wherein during a given day of the current month, the operations further comprise:
detecting multiple transactions that occur with respect to the transaction account in a span that extends from a first day of the current month to the current day;
for each of the multiple detected transactions, determining a similarity of the transaction to one or more of the baseline transaction data sets;
based on the transaction model, update the predicted net ledger value based on the detected transaction;
dynamically configuring the graphic feature to represent a gauge having a gauge needle that is angularly positionable between a maximum value and a minimum value, the angular position reflecting the updated, predicted net ledger value, scaled according a scaling factor that is specific to transaction amounts of the user; and
based on the predicted net ledger value as indicated by the graphic feature, enabling the user to perform, through the user-interface, a recommended action to optimize an objective of the user for the transaction account.

8. The non-transitory computer-readable medium of claim 7, wherein during the span of the current month, the operations further comprise:
determining an abnormal portion of the amount of each of the multiple transactions; and
predicting the net ledger value, based at least in part on an aggregate of the abnormal amounts of each detected transaction.

9. The non-transitory computer-readable medium of claim 8, wherein during the span of the current month, the operations further comprise:
for each of the multiple detected transactions, (i) determining a similarity of the transaction to one or more of the base transaction data sets, and (ii) based on the determined similarity, determining a normalcy of the transaction, the normalcy identifying a normal portion of a corresponding transaction amount, and the abnormal portion of the corresponding transaction amount.

10. The non-transitory computer-readable medium of claim 9, wherein during the span of the current month, the operations further comprise:
determining, for each transaction of the multiple transactions, the similarity of the transaction to one or more of the base transaction data sets by mapping the transaction to the cylindrical, three-dimensional space, based on a date and amount of the transaction, and then calculating a similarity of the transaction to other historical transactions based on a proximity the transaction to one or more historical transactions that are also mapped to the cylindrical three-dimensional space.

11. The non-transitory computer-readable medium of claim 10, wherein the operations further comprise:
in response to detecting a transaction during the current cyclical time period, pivoting the gauge needle by an angular amount that is based at least in part on a change to the updated net ledger value resulting from the detected transaction.

12. The non-transitory computer-readable medium of claim 10, wherein the operations further comprise:
displaying an amount that is based on the updated net ledger value along with the graphic feature.

13. A computer-implemented method performed by one or more processors of a computer system, the method comprising:

providing, on a computing device of a user, in conjunction with an interactive user-interface, a scaled and dynamically responsive graphic feature that is indicative of a net ledger value of a transaction account of a user, the net ledger value predicting a sum total of debits and credits to the transaction account on a future date that coincides with a final day of a current month;

wherein providing the scaled and dynamically responsive graphic feature includes:

communicating, over one or more networks, with the transaction account of the user to obtain historical transaction information for a prior time interval that includes multiple prior months, the historical transaction information identifying a plurality of transactions that credited to or debited from the transaction account, wherein each of the plurality of transactions are associated with a transaction amount and a transaction date;

generating a transaction model for a normalized time interval by (i) analyzing historical transaction information that spans the prior months to determine a set of characteristics for each transaction of the historical transaction information; (ii) based in part on the determined set of characteristics for each transaction of the historical transaction information, normalizing the determined set of characteristics of each of the historical transactions for a difference in length between the prior month in which the historical transaction occurred and the normalized time interval; (iii) mapping each of the plurality of transactions onto a circular data structure representation of a cyclical time period, each mapped transaction being associated with a corresponding position on the circular data structure that is based at least in part on (a) a radial position that indicates a time interval during one of the prior months that coincides with the associated transaction date, and (b) a height that is based on the associated transaction amount; and (iv) determining a plurality of baseline transaction data sets, each baseline transaction data set corresponding to a set of multiple transactions that are deemed similar to one another based on the corresponding positions associated with each of the multiple transactions;

on or before a start interval of a current month, predicting, based on the normalized set of characteristics of each transaction of the historical transaction information, an initial net ledger value for the transaction account of the user for a final day of the current month;

wherein during a given day of the current month, the method further comprises:

detecting multiple transactions that occur with respect to the transaction account in a span that extends from a first day of the current month to the current day;

for each of the multiple detected transactions, determining a similarity of the transaction to one or more of the baseline transaction data sets;

based on the transaction model and the predicted net ledger value, updating the predicted net ledger value based on the detected transaction;

dynamically configuring the graphic feature to represent a gauge having a gauge needle that is angularly positionable between a maximum value and a minimum value, the angular position reflecting the updated, predicted net ledger value, scaled according a scaling factor that is specific to transaction amounts of the user; and based on the predicted net ledger value as indicated by the graphic feature, enabling the user to perform, through the user-interface, a recommended action to optimize an objective of the user for the transaction account.

* * * * *